US 9,157,726 B2

(12) United States Patent
Makihira et al.

(10) Patent No.: US 9,157,726 B2
(45) Date of Patent: Oct. 13, 2015

(54) OPTICAL COHERENCE TOMOGRAPHIC IMAGING APPARATUS AND METHOD THEREOF

(71) Applicant: CANON KABUSHIKI KAISHA, Tokyo (JP)

(72) Inventors: Tomoyuki Makihira, Tokyo (JP); Yoshihiko Iwase, Kyoto (JP); Kazuhide Miyata, Yokohama (JP); Makoto Sato, Tokyo (JP); Kazuro Yamada, Kawasaki (JP); Ritsuya Tomita, Kawasaki (JP); Daisuke Kibe, Chigasaki (JP); Hiroyuki Shinbata, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 13/851,770

(22) Filed: Mar. 27, 2013

(65) Prior Publication Data
US 2013/0258350 A1 Oct. 3, 2013

(30) Foreign Application Priority Data
Mar. 30, 2012 (JP) .................................. 2012-082373

(51) Int. Cl.
*G01B 9/02* (2006.01)
(52) U.S. Cl.
CPC .................................. *G01B 9/02015* (2013.01)
(58) Field of Classification Search
CPC ........... G01B 9/02015; G01B 9/02004; G01B 9/02058; G01B 9/02063; G01B 9/02091; A61B 3/12

USPC ................................................... 356/479, 497
See application file for complete search history.

(56) References Cited

U.S. PATENT DOCUMENTS

| 5,321,501 A | 6/1994 | Swanson et al. |
| 2007/0070295 A1 | 3/2007 | Tsukada et al. |
| 2008/0007693 A1* | 1/2008 | Williams et al. ............... 351/221 |
| 2010/0208201 A1* | 8/2010 | Knighton et al. ............. 351/206 |
| 2010/0302508 A1* | 12/2010 | Yamamoto et al. ........... 351/206 |
| 2010/0315590 A1* | 12/2010 | Ueno ............................. 351/206 |
| 2011/0170063 A1 | 7/2011 | Ooban et al. |

FOREIGN PATENT DOCUMENTS

| JP | 2007-117714 A | 5/2007 |
| JP | 2007-327909 A | 12/2007 |
| JP | 2008-209166 A | 9/2008 |

* cited by examiner

*Primary Examiner* — Jonathan Hansen
(74) *Attorney, Agent, or Firm* — Canon USA, Inc. I.P. Division

(57) ABSTRACT

An optical coherence tomographic imaging apparatus including a planar image obtaining unit configured to obtain a planar image of a subject based on a return beam from the subject irradiated by the irradiation unit that irradiates the subject with light of a first wavelength band, a tomographic image obtaining unit configured to obtain a tomographic image of the subject based on a beam in which a return beam from the subject irradiated with the laser beam emitted while sweeping a second wavelength range which is longer than the first wavelength band and a reference beam corresponding to the laser beam are combined, and a correction unit configured to correct an optical path length difference generated due to a difference between the first wavelength band and the second wavelength band.

12 Claims, 13 Drawing Sheets

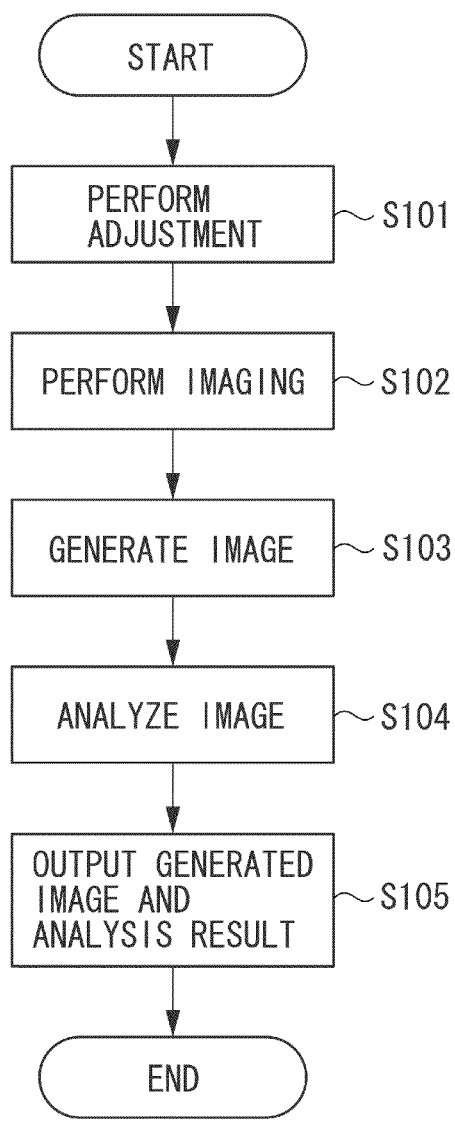

OPTICAL COHERENCE TOMOGRAPHIC IMAGING APPARATUS AND METHOD THEREOF

BACKGROUND OF THE INVENTION

1. Field of the Invention

The present invention relates to an optical coherence tomographic imaging apparatus that captures an image of a subject using Optical Coherence Tomography (OCT), and a method thereof.

2. Description of the Related Art

An optical coherence tomographic imaging apparatus for capturing an image of an eye, such as OCT, allows three-dimensional observation of an internal state of retinal layers. Such an optical coherence tomographic imaging apparatus has been recently attracting attention as being useful in more accurately diagnosing diseases.

A time domain (TD-) OCT is a type of OCT in which a broad spectrum light source is combined with a Michelson interferometer. The TD-OCT is configured such that by scanning a delay in a reference arm, the interference light generated by a backscattered light of a signal arm and the light from the reference arm is measured to obtain information on depth resolution. However, high-speed image acquisition is difficult in the above described TD-OCT. To address this, as a method for obtaining the image at higher speed, a spectral domain (SD-) OCT which uses the broad spectrum light source and obtains an interferogram employing a spectroscope is known. Further, U.S. Pat. No. 5,321,501 discusses a swept source (SS-) OCT in which a single channel light detection device measures spectral interference by employing a high-speed wavelength swept light source as the light source.

In general, an OCT tomographic image is obtained using light of a wavelength band of 800 nm to 900 nm as illustrated in FIG. 13A. Japanese Patent Application Laid-Open No. 2008-209166 discusses obtaining, before obtaining the OCT tomographic image, an infrared observation image of a fundus using light of the wavelength band of 700 nm to 800 nm. Further, after obtaining the OCT tomographic image, a visible still image of a fundus is obtained using light of the wavelength band of 400 nm to 700 nm.

Furthermore, peaks of an absorption coefficient of water, which is a main component of a biological object such as a subject's eye, exist at 980 nm and 1200 nm in the vicinity of the wavelength of 1000 nm. Japanese Patent Application Laid-Open No. 2007-327909 discusses obtaining the OCT tomographic image using light of the wavelength band of 980 nm to 1200 nm to avoid being affected by the absorption coefficient peaks.

In general, it is known that since an optical path length difference is generated between light of different wavelengths, positional deviation of a focus position is generated. As a result, if the OCT tomographic image is obtained using light of the wavelength band of 980 nm to 1200 nm instead of 800 nm to 900 nm, the following occurs. When the OCT tomographic image is obtained after obtaining the infrared observation image, the positional deviation of focus position is increased compared with ever before. It thus becomes difficult to obtain a high-quality OCT tomographic image.

SUMMARY OF THE INVENTION

An embodiment of the present invention is directed to reducing the positional deviation of the focus position increased compared with ever before to obtain a high-quality OCT tomographic image.

Further, an embodiment of the present invention is directed to providing operational advantages derived by each of configurations illustrated in exemplary embodiments of the present invention to be described below, the operational advantages are not obtainable by conventional techniques.

According to an aspect of the present invention, an optical coherence tomographic imaging apparatus includes an irradiation unit configured to irradiate a subject with light of a first wavelength band, a planar image obtaining unit configured to obtain a planar image of the subject based on a return beam from the subject irradiated by the irradiation unit, a light source configured to emit a laser beam while sweeping a second wavelength band that is longer than the first wavelength band, a tomographic image obtaining unit configured to obtain a tomographic image of the subject based on a beam in which a return beam from the subject irradiated with the laser beam emitted from the light source by the irradiation unit and a reference beam corresponding to the laser beam are combined, and a correction unit configured to correct an optical path length difference generated due to a difference between the first wavelength band and the second wavelength band.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating an example of a process performed by the optical coherence tomographic imaging apparatus according to the first exemplary embodiment.

DESCRIPTION OF THE EMBODIMENTS

Figure 1:
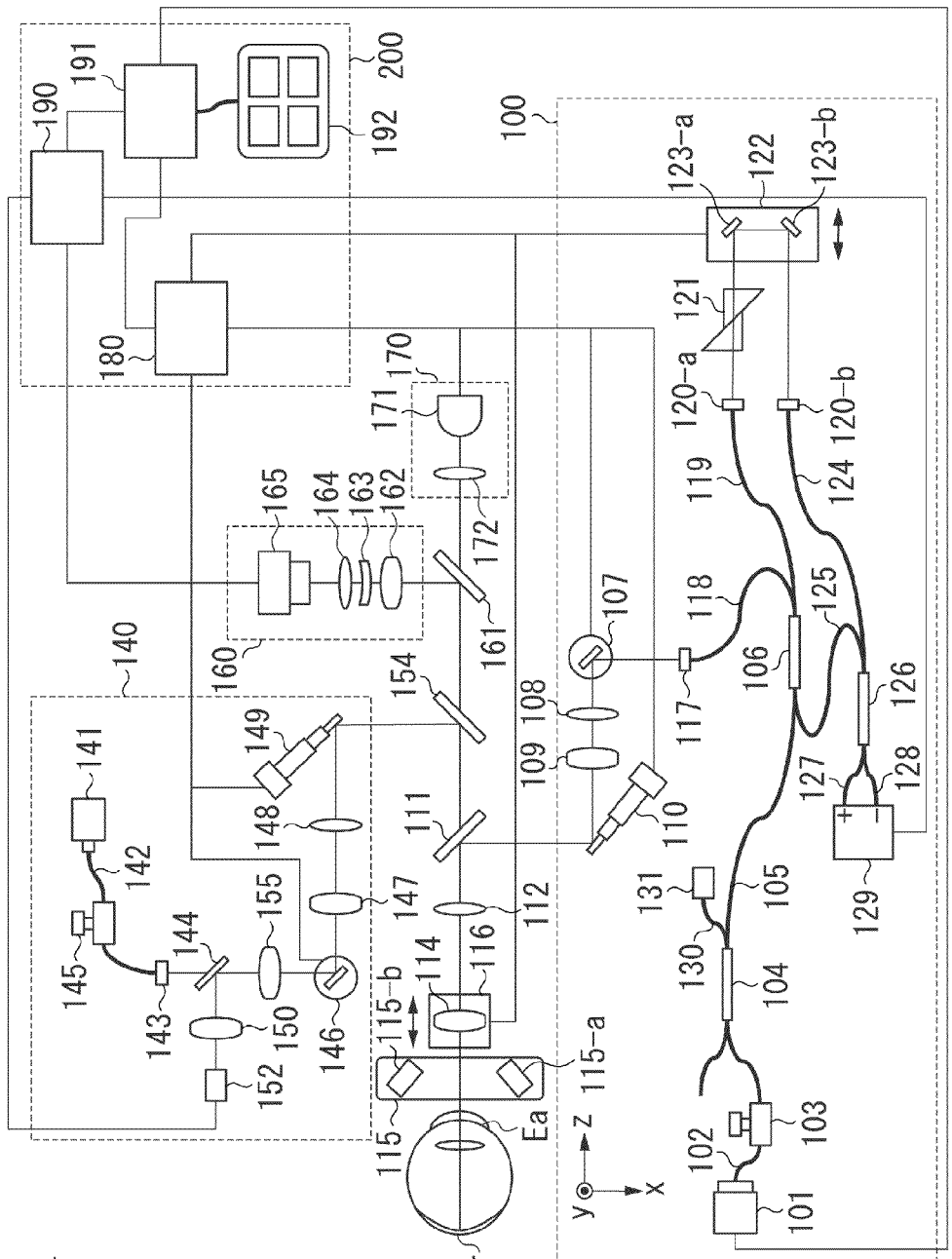
FIG. 1 is a schematic diagram illustrating an example of a configuration of an optical coherence tomographic imaging apparatus according to a first exemplary embodiment.

Various exemplary embodiments, features, and aspects of the invention will be described in detail below with reference to the drawings.

According to the exemplary embodiment of the present invention, the optical coherence tomographic imaging apparatus includes the irradiation unit configured to irradiate the subject with light of the first wavelength band. The first wavelength band is, for example, 400 nm to 700 nm. Further, the irradiation unit is an illumination optical system including an objective lens.

Furthermore, the optical coherence tomographic imaging apparatus includes a planar image obtaining unit configured to obtain a planar image of the subject based on a return beam from the subject irradiated by the irradiation unit. The planar image obtaining unit obtains the planar image of the subject based on an output signal from an imaging unit on which the return beam from the subject irradiated with light of the first wavelength band is formed into an image via an imaging optical system.

Moreover, the optical coherence tomographic imaging apparatus includes the light source configured to emit a laser beam while sweeping the second wavelength band which is longer than the first wavelength band. The second wavelength band is, for example, 980 nm to 1100 nm. Further, an example of the light source is a wavelength swept light source of the SS-OCT.

Furthermore, the optical coherence tomographic imaging apparatus includes the tomographic image obtaining unit configured to obtain the tomographic image of the subject based on a beam in which the return beam from the subject irradiated with the laser beam emitted from the light source by the irradiation unit and a reference beam corresponding to the laser beam are combined. The tomographic image obtaining unit is capable of obtaining a SS-OCT tomographic image.

Moreover, the optical coherence tomographic imaging apparatus includes a correction unit configured to correct the optical path length difference generated by the difference between the first wavelength band and the second wavelength band. As a result, the increase in positional deviation of the focus position is reduced to obtain a high-quality OCT tomographic image. It is desirable that the correction unit is configured such that a focus lens is moved, i.e., an example of a focusing unit, as described below according to the second exemplary embodiment. Further, positions at which a sensor for the fundus camera and a sensor for the SS-OCT are arranged in the respective optical paths may be displaced by a distance corresponding to the optical path length difference. The correction unit according to an embodiment of the present invention is not limited thereto, as long as the optical path length difference caused by the difference in the wavelength bands can be corrected.

The optical coherence tomographic imaging apparatus according to an embodiment of the present invention is applicable to a subject such as the subject's eye, the skin, and internal organs. If the subject is the subject's eye, the planar image is a fundus image. Further, the optical coherence tomographic imaging apparatus according to an embodiment of the present invention is an ophthalmologic apparatus or an endoscope, which will be described in detail below with reference to the drawings.

The first exemplary embodiment will be described below.
Entire Configuration of the Apparatus FIG. 1 is a schematic diagram illustrating an example of a configuration of an optical coherence tomographic imaging apparatus according to the present exemplary embodiment.

According to the present exemplary embodiment, the optical coherence tomographic imaging apparatus includes an SS-OCT (hereinafter may be simply referred to as OCT) 100, a scanning laser ophthalmoscope (SLO) 140, an anterior eye portion imaging unit 160, an internal fixation lamp 170, and a control unit 200.

Since the spectroscope used in the SD-OCT disperses the interference light employing a diffraction grating, crosstalk of the interference light tends to occur between adjacent pixels of a line sensor. Further, the interference light from a reflection surface positioned at a depth position Z=Z0 vibrates at a frequency of Z0/Π with respect to a wave number k. A vibration frequency of the interference light thus increases as Z0 increases (i.e., the reflection surface moves away from a coherence gate position), so that the effect of the crosstalk of the interference light between the adjacent pixels in the line sensor increases. As a result, if the SD-OCT is to perform imaging at a deeper position, sensitivity is noticeably lowered. In contrast, the SS-OCT which does not use the spectroscope is advantageous as compared to the SD-OCT in capturing the tomographic image at a deeper position.

Further, in the spectroscope of the SD-OCT, there is a loss of interference light due to the diffraction grating. On the other hand, the SS-OCT is configured to not include the spectroscope and to perform differential detection of the interference light, so that it is easy to improve the sensitivity. The SS-OCT is thus capable of performing high-speed processing at the same level of sensitivity as the SD-OCT, and obtaining a tomographic image of a wide viewing angle employing the high-speed capability.

Figure 4:
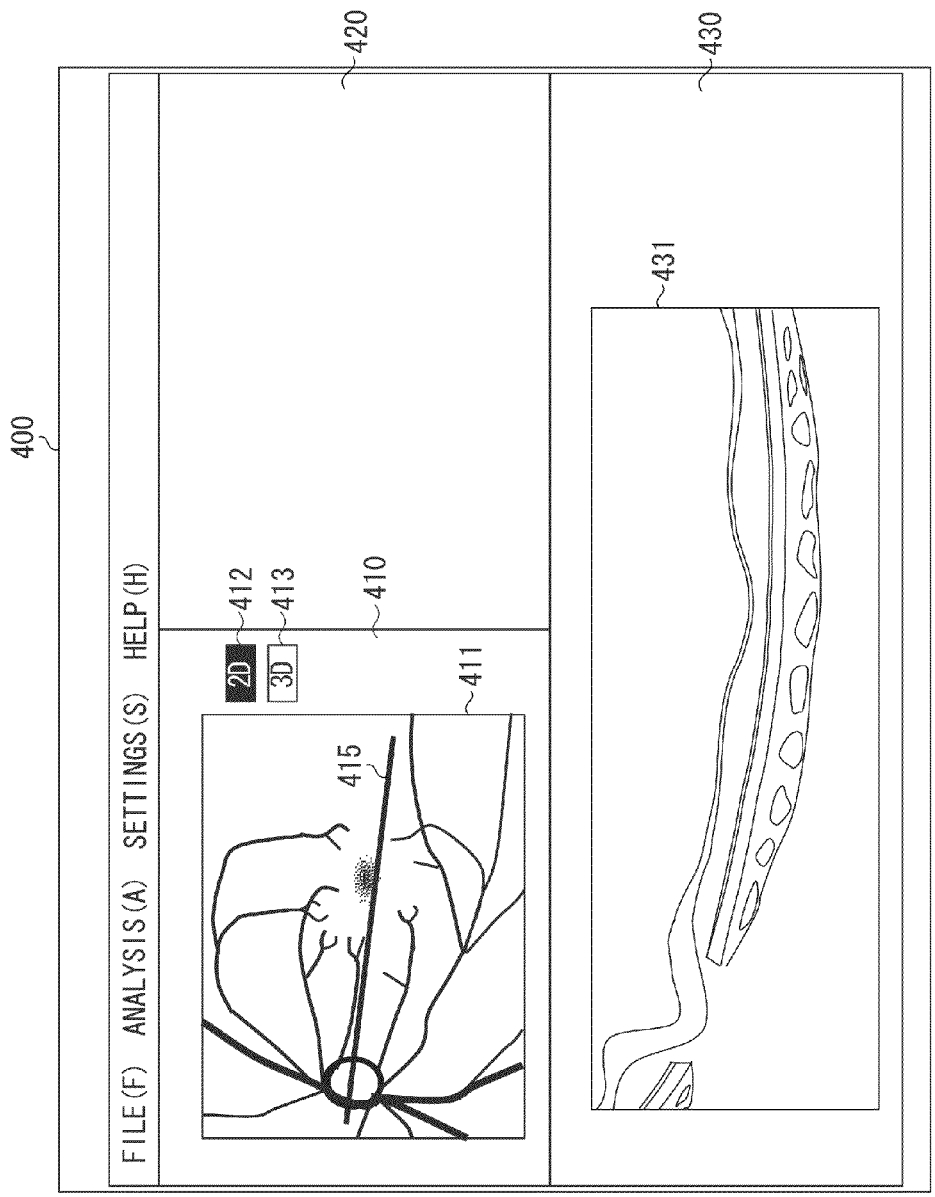
FIG. 4 illustrates a display example on a display unit according to the first exemplary embodiment.

Furthermore, Japanese Patent Application Laid-Open No. 2007-117714 discusses the SD-OCT which displays the tomographic image and the fundus image side by side in a horizontal direction of a display area on the display unit. If the display method of the SD-OCT is directly applied to the SS-OCT, it becomes necessary to display the tomographic image with reduced, or display a portion of the tomographic image due to the limit on the size of the display area. To solve such a problem, it is desirable to display the images by aligning in a vertical direction of the display area as illustrated in FIG. 4 to efficiently display the tomographic images obtained by the SS-OCT.

The optical coherence tomographic imaging apparatus is aligned by lighting and causing the subject's eye to gaze at the internal fixation lamp 170, and using the image of the anterior eye portion of the subject captured by the anterior eye portion imaging unit 160. After completing the alignment, an OCT 100 and an SLO 140 perform imaging of the fundus.
Configuration of the OCT 100

An example of the configuration of the OCT 100 will be described below.

The OCT 100 corresponds to an example of the tomographic image obtaining unit configured to obtain the tomographic image of the subject's eye.

Figure 13A:
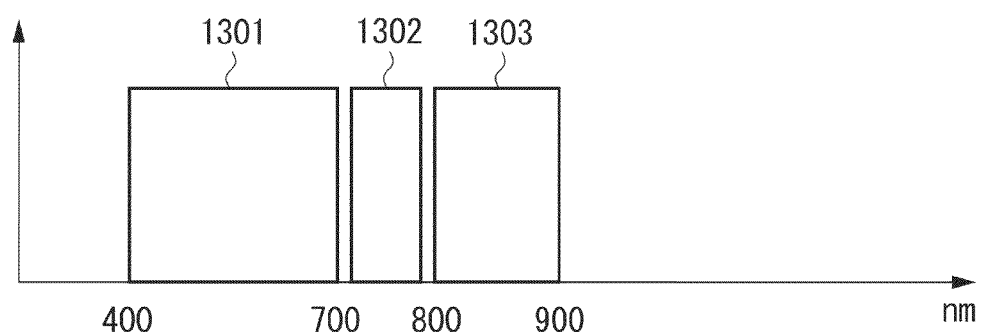
FIGS. 13A and 13B illustrate each wavelength band.
Figure 13B:
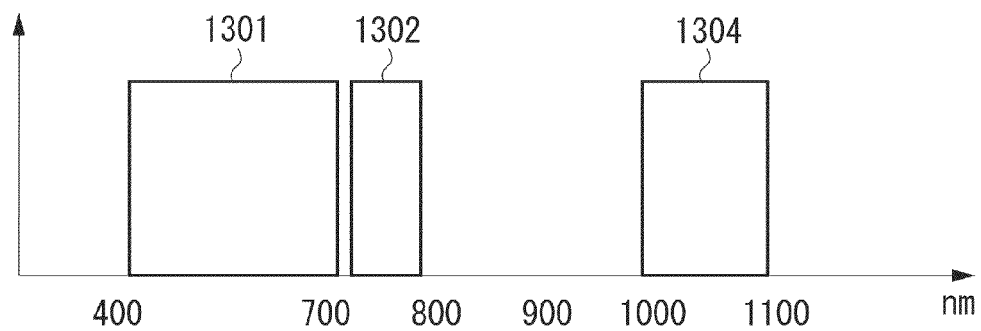

A light source 101 which is a variable wavelength light source emits light, for example, having a central wavelength of 1040 nm and a bandwidth of 100 nm (wavelength band 1304 in FIG. 13B). A control unit 191 controls the wavelength of the light emitted from the light source 101. More specifically, when the OCT 100 obtains the tomographic image, the control unit 191 sweeps the wavelength of the light emitted from the light source 101. The control unit 191 thus corresponds to an example of a control unit configured to cause the wavelength of the light emitted from a light source to be swept. It is desirable that the wavelength of the light emitted from the light source 101 is swept at constant cycle. It is further desirable that the wavelength is swept so that the wave number (i.e., a reciprocal of the wavelength) is at regular intervals, due to calculation constraints when performing Fourier transform.

The light emitted from the light source 101 is guided to a fiber coupler 104 via a fiber 102 and a polarization controller 103, and is divided to a fiber 130 for measuring a light amount, and a fiber 105 for performing OCT measurement. A power meter (PM) 131 measures the power of the light via the fiber 130. The light is then guided to a second fiber coupler 106 via the fiber 105. The light is split into a measuring beam (also referred to as an OCT measuring beam) and a reference beam at the fiber coupler 106.

The polarization controller 103 adjusts a polarization state of the beam emitted from the light source 101, and adjusts the beam to a linearly-polarized beam. A branching ratio of the fiber coupler 104 is 99:1, and the branching ratio of the fiber coupler 106 is 90 (reference beam):10 (measuring beam). The branching ratios are not limited thereto, and may be other values.

The measuring beam split by the fiber coupler 106 is output from a collimator 117 via a fiber 118 as a parallel beam. The output measuring beam reaches a lens 109 via an X scanner 107 and lenses 108. The X scanner 107 includes a galvano mirror that performs a scan with the measuring beam in a horizontal direction (i.e., in a vertical direction with respect to the drawing) on a fundus Er. Further, the measuring beam from the lens 109 reaches a dichroic mirror 111. The Y scanner 110 includes a galvano mirror that performs a scan with the measuring beam in a vertical direction (i.e., in a depth direction with respect to the drawing) on the fundus Er. The X scanner 107 and the Y scanner 110 are controlled by a drive control unit 180, and are capable of scanning a desired range on the fundus Er with the measuring beam in. The dichroic mirror 111 has a characteristic to reflect light having wavelengths of, for example, 950 nm to 1100 nm, and transmit light of other wavelengths.

The measuring beam reflected by the dichroic mirror 111 reaches via a lens 112 a focus lens 114 mounted on a stage 116. The focus lens 114 focuses the measuring beam on the retinal layers in the fundus Er via an anterior eye portion Ea of the subject's eye. In other words, the optical system from the light source 101 to the subject's eye corresponds to an example of an illumination optical system that guides the light emitted from the light source to the subject's eye. The measuring beam irradiating the fundus Er is reflected and scattered by each retinal layer, returns to the fiber coupler 106 via the above-described optical path, and reaches a fiber coupler 126 via a fiber 125.

The drive control unit 180 controls the movement of the focus lens 114 in an optical axis direction. Further, according to the present exemplary embodiment, the focus lens 114 is shared by the OCT 100 and the SLO 140. However, it is not limited thereto, and each optical system may respectively include a focus lens. Further, the drive control unit 180 may control driving of the focus lens based on the difference between the wavelength employed by the light source 101 and the wavelength employed by a light source 141. For example, if the OCT 100 and the SLO 140 share the focus lens, the drive control unit 180 moves, when an operator switches between performing imaging by the SLO 140 and by the OCT 100, the focus lens according to the difference in the wavelengths. Further, if the OCT 100 and the SLO 140 each include the focus lens, the drive control unit 180 moves, when the focus lens in one of the optical systems is adjusted, the focus lens in the other optical system according to the difference in the wavelengths.

On the other hand, the reference beam split by the fiber coupler 106 is output via a fiber 119 from a collimator 120-a as a parallel beam. The output reference beam is then reflected via a dispersion compensation glass 121 by mirrors 123-a and 123-b mounted on a coherence gate stage 122, and reaches the fiber coupler 126 via a collimator 120-b and a fiber 124. The coherence gate stage 122 is controlled by the drive control unit 180 to deal with differences in an axial length of the subject's eye.

The return beam and the reference beam that have reached the fiber coupler 126 are combined to become an interference beam. The interference beam then reaches a differential detector 129, i.e., a light detection unit, via fibers 127 and 128, and the differential detector 129 converts the interference signal to an electrical signal. In other words, the optical system from the subject's eye to the differential detector 129 corresponds to an example of an imaging optical system configured to guide to the imaging unit the return beam from the subject's eye of the beam swept by the control unit. A signal processing unit 190 analyzes the converted electrical signal. The light detection unit is not limited to the differential detector, and may be other detection units.

Further, according to the present exemplar embodiment, the measuring beam and the reference beam interfere with each other in the fiber coupler 126. However, it is not limited thereto, and the mirror 123-a may be arranged so that the reference beam is reflected to the fiber 119, and the measuring beam and the reference beam may be caused to interfere with each other in the fiber coupler 106. In such a case, the mirror 123-b, the collimator 120-b, the fiber 124, and the fiber coupler 126 become unnecessary. It is desirable to use a circulator in such a configuration.

Configuration of the SLO 140

An example of the configuration of the SLO 140 will be described below.

The SLO 140 corresponds to an example of the fundus image obtaining unit configured to obtain the fundus image of the subject's eye.

The light source 141, e.g., a semiconductor laser, emits light having a central wavelength of, for example, 780 nm (wavelength band 1302 in FIG. 13B). The measuring beam emitted from the light source 141 (also referred to as a SLO measuring beam) is polarized via a fiber 142 by a polarizing controller 145 to a linearly-polarized beam, and is output from a collimator 143 as a parallel beam. The output measuring beam then passes through a perforated portion of a perforated mirror 144, and reaches, via a lens 155, a dichroic mirror 154 via an X scanner 146, lenses 147 and 148, and a Y scanner 149. The X scanner 146 includes a galvano mirror that performs a scan with the measuring beam in the horizontal direction on the fundus Er, and the Y scanner 149 includes a galvano mirror that performs a scan with the measuring beam in the vertical direction on the fundus Er. It is not necessary to include the polarization controller 145. The λ scanner 146 and the Y scanner 149 are controlled by the drive control unit 180, and are capable of scanning the desired range on the fundus with the measuring beam. The dichroic mirror 154 reflects light having wavelengths of, for example, 760 nm to 800 nm, and transmits light of other wavelengths.

The linearly-polarized measuring beam reflected by the dichroic mirror 154 passes through the dichroic mirror 111 and reaches the fundus Er via the optical path similar to that of the OCT 100.

The SLO measuring beam irradiating the fundus Er is reflected and scattered by the fundus Er, and reaches the perforated mirror 144 via the above-described optical path. The beam reflected by the perforated mirror 144 is received via a lens 150 by an avalanche photodiode (APD) 152, converted into an electrical signal, and received by the signal processing unit 190.

The position of the perforated mirror 144 is conjugate with the position of the pupil in the subject's eye. The perforated mirror 144 reflects the light that has passed through a peripheral region of the pupil among the reflected and scattered light of the measuring beam with which the fundus Er is irradiated.

The Anterior Segment Imaging Unit 160

An example of the configuration of the anterior eye portion imaging unit 160 will be described below.

The anterior eye portion imaging unit 160 includes lenses 162, 163, and 164, and an anterior eye portion camera 165.

An illumination light source 115, including light emitting diodes (LED) 115-a and 115-b that emit illumination light having a wavelength of, for example, 850 nm, irradiates the anterior eye portion Ea. The light reflected by the anterior eye portion Ea reaches a dichroic mirror 161 via the focus lens 114, the lens 112, and the dichroic mirrors 111 and 154. The dichroic mirror 161 reflects light having wavelengths of, for example, 820 nm to 900 nm, and transmits light of other wavelengths. The light reflected by the dichroic mirror 161 is then received by the anterior eye portion camera 165 via the lenses 162, 163, and 164. The light received by the anterior segment camera 165 is converted into an electrical signal and is received by the signal processing unit 190.

The Internal Fixation Lamp 170

The internal fixation lamp 170 will be described below.

The interior fixation lamp 170 includes a display unit 171 and a lens 172. A plurality of LEDs arranged in a matrix state is used as the display unit 171. A lighting position of the LEDs is changed by control performed by the drive control unit 180 according to a region to be imaged. The light emitted from the display unit 171 is guided to the subject's eye via the lens 172. The display unit 171 emits light having a wavelength of, for example, 520 nm, and the drive control unit 180 displays a desired pattern.

The Control Unit 200

The control unit 200 will be described below.

The control unit 200 includes the drive control unit 180, the signal processing unit 190, the control unit 191, and the display unit 192.

As described above, the drive control unit 180 controls each unit.

The signal processing unit 190 generates images, analyzes the generated images, and generates visualization information of the analysis results based on the signals output from the differential detector 129, the APD 152, and the anterior eye portion camera 165. The image generation process will be described in detail below.

The control unit 191 controls the entire apparatus and displays, on a display screen in the display unit 192, the images generated by the signal processing unit 190. The display unit 192 corresponds to an example of a display unit or a display apparatus. Further, the image data generated by the signal processing unit 190 may be transmitted to the control unit 191 via wired or wireless communication.

The display unit 192 such as a liquid crystal display, displays various types of information as described below under control of the control unit 191. The control unit 191 may transmit the image data to the display unit 192 via wired or wireless communication. Further, according to the present exemplary embodiment, the display unit 192 is included in the control unit 200. However, it is not limited thereto, and may be separated from the control unit 200.

Furthermore, a tablet, which is an example of a portable device, configured by integrating the control unit 191 and the display unit 192, may be used. In such a case, it is desirable to include a touch panel function in the display unit 192, so that a user can perform operation on the touch panel to move the display position of the images, enlarge and reduce the images, and change the images to be displayed. The touch panel function may be included in the display unit 192 even in the case where the control unit 191 and the display unit 192 are not integrated. In other words, the touch panel may be used as an instruction device.

Image Processing

Image generation and image analysis processes performed in the signal processing unit 190 will be described below.

Tomographic Image Generation and Fundus Image Generation Processes

The signal processing unit 190 performs, on the interference signal output from the differential detector 129, common reconfiguration processing, and thus generates a tomographic image.

More specifically, the signal processing unit 190 performs fixed pattern noise cancellation on the interference signal. The fixed pattern noise cancellation is performed by averaging a plurality of A-scan signals that has been detected and thus extracting the fixed pattern noise, and subtracting the extracted fixed pattern noise from the input interference signal.

The signal processing unit 190 then performs desired window function processing in order to optimize depth resolution and dynamic range having a trade-off relation when performing Fourier transform in a finite interval. The signal processing unit 190 performs fast Fourier transform (FFT) processing, and thus generates the tomographic image.

Figure 2A:
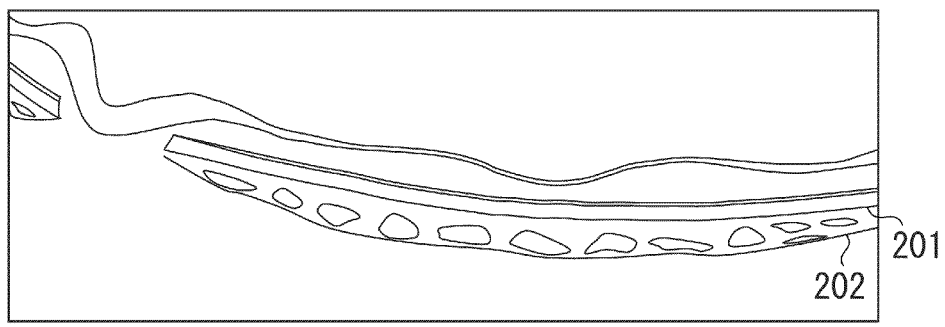
FIGS. 2A and 2B illustrate examples of a tomographic image obtained by the optical coherence tomographic imaging apparatus capturing the image of the subject's eye according to the first exemplary embodiment.
Figure 2B:
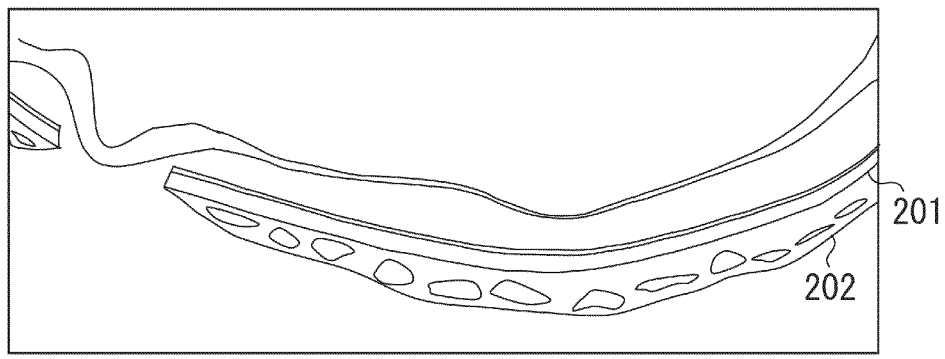

FIGS. 2A and 2B illustrate examples of the tomographic images captured by the OCT 100 and generated by the signal processing unit 190.

More specifically, FIG. 2A illustrates an example of a tomographic image of a normal eye, and FIG. 2B illustrates an example of a tomographic image of a myopic eye. Referring to FIGS. 2A and 2B, a retinal pigment epithelium-choroid boundary 201, a choroid-sclera boundary 202, and boundaries of other layers are imaged. FIGS. 2A and 2B indicate, as described above, that the OCT 100 is capable of obtaining the tomographic image of a wider range (i.e., greater in size in the horizontal direction with respect to the drawing) as compared to the SD-OCT. Further, the OCT 100 is capable of obtaining the tomographic image which is deeper in the depth direction (i.e., greater in size in the vertical direction with respect to the drawing) as compared to the SD-OCT as described above.

When displaying the tomographic image on the display area of the display unit 192, it is meaningless to display an area in which there is no image of a fundus tissue of the subject's eye. According to the present exemplary embodiment, the control unit 191 thus recognizes from data in a memory in the signal processing unit 190 a portion corresponding to the image of a fundus tissue of the subject's eye. The control unit 191 then cuts out from the recognized portion the tomographic image matching the size of the display area, and displays the tomographic image.

Segmentation

The signal processing unit 190 performs segmentation of the tomographic image.

More specifically, the signal processing unit 190 applies to the tomographic image to be processed, a median filter and a Sobel filter, and thus generates respective images (hereinafter referred to as a median image and a Sobel image). The signal processing unit 190 then generates a profile for each A-scan from the generated median image and the Sobel image. The signal processing unit 190 generates the profile of a luminance value from the median image and the profile of a gradient from the Sobel image. The signal processing unit 190 detects peaks in the profiles generated from the Sobel image. Further, signal processing unit 190 extracts a boundary of each area in the retina layer by referring to the profiles of the median image corresponding to regions before and after the detected peaks and the regions between the detected peaks.

Furthermore, the signal processing unit 190 measures each layer thickness in the direction of the A-scan line, and generates a layer thickness map of each layer.

Processing Operation

The processing operation performed in the ophthalmologic apparatus according to the present exemplary embodiment will be described below.

FIG. 3 is a flowchart illustrating the process performed by the ophthalmologic apparatus according to the present exemplary embodiment.

Adjustment

In step S101, the ophthalmologic apparatus and the subject's eye positioned on the ophthalmologic apparatus are aligned. The process unique to the present exemplary embodiment with respect to performing alignment will be described below. Since alignment of a working distance, focusing, and adjustment of the coherence gate are common, description will be omitted.

Adjustment of the OCT Imaging Position

Figure 5:
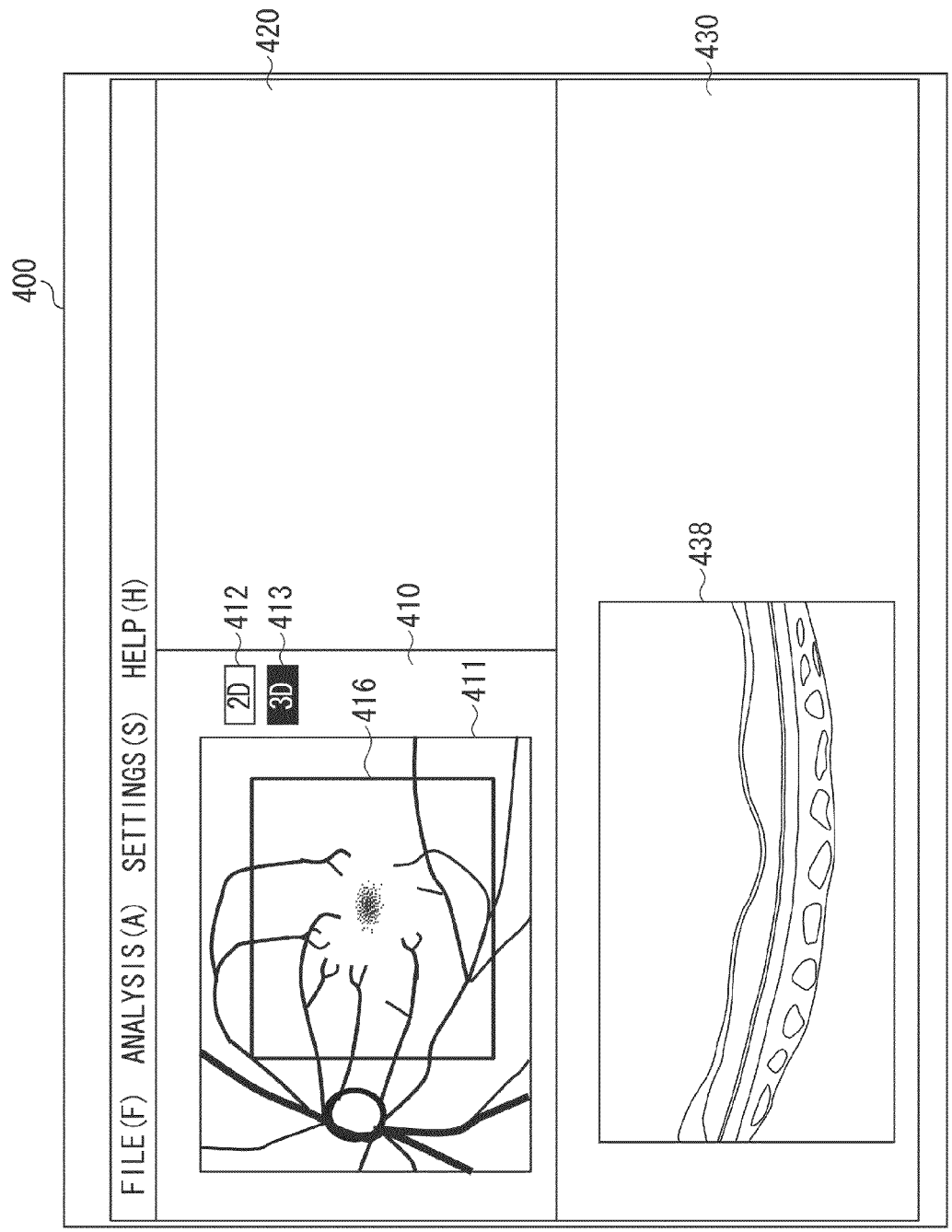
FIG. 5 illustrates a display example on the display unit according to the first exemplary embodiment.

FIGS. 4 and 5 illustrate examples of a window 400 displayed on the display unit 192 when performing adjustment or after performing imaging.

An operator using an instruction device (not illustrated) such as a mouse designates a box 412 or a box 413 by a cursor. The operator thus designates as an imaging mode, a two-dimensional (2D) imaging mode (refer to FIG. 4) or a three-dimensional (3D) imaging mode (refer to FIG. 5).

The imaging mode is then set based on the instruction and the set imaging mode is displayed on an area 410. A fundus image (i.e., a luminance image) 411 captured by the SLO 140 and generated by the signal processing unit 190 is displayed on the area 410. The area defined by an exterior frame of the fundus image 411 is the display area of the fundus image. Hereinafter, the display area of the fundus image in the area 410 may be referred to as a fundus image display area. According to the present exemplary embodiment, the fundus image display area corresponds to an example of a first area. The fundus image 411 is a moving image obtained when performing adjustment or an image obtained after performing imaging.

A linear line 415 as illustrated in FIG. 4 or a rectangle 416 as illustrated in FIG. 5, indicating an imaging area of the OCT 100, is superimposed and displayed on the fundus image 411 according to the imaging mode. According to the present exemplary embodiment, a display form indicating the imaging area displayed on the fundus image 411 is not limited to the linear line and the rectangle. For example, if a circle scan is to be performed, a circle is displayed on the fundus image 411.

A tomographic image 431 illustrated in FIG. 4 is a moving image obtained when performing adjustment or an image obtained after performing imaging. The tomographic image 431 includes a macula and an optic disk of the subject's eye. Further, a tomographic image 438 illustrated in FIG. 5 is a moving image obtained when performing adjustment or an image obtained after performing imaging. The areas defined by the exterior frames of the tomographic images 431 and 438 are the display areas of the tomographic images. Hereinafter, the display area of the tomographic image in the area 430 may be referred to as a tomographic image display area. According to the present exemplary embodiment, the tomographic image display area corresponds to an example of a second area positioned above or below the first area and which is an area wider in the horizontal direction as compared to the first area.

The tomographic image display area may be an area larger in the vertical direction (i.e., in the vertical direction with respect to the display unit 192) as compared to the fundus image display area. In other words, the second area may be larger in the vertical direction as compared to the first area.

As illustrated in FIGS. 4 and 5, the size of the tomographic image display area may be changed according to the imaging area of the tomographic image. More specifically, if an angle of view of the tomographic image is greater than or equal to a predetermined value, the horizontal width of the tomographic image display area may be increased as illustrated in FIG. 4. Further, if the imaging area of the tomographic image is an angle of view that is less than the predetermined value, the horizontal width of the tomographic image display area may be decreased as illustrated in FIG. 5.

The operator designates the imaging area using the instruction device (not illustrated) such as the mouse. Specifically, the operator sets the size and adjusts the position of the linear line 415 and the rectangle 416 using the instruction device to control a drive angle of a scanner by the drive control unit 180 and then determines the imaging area. For example, if the operator has selected the 2D imaging mode, the macula and the optic disk may be automatically extracted from the fundus image 411, and a linear line that passes through the macula and the optic disk may be set as an initial tomographic image obtaining position. Further, the operator may use the instruction device to designate two points on the fundus image 411, so that a linear line connecting the two points is set as the tomographic image obtaining position.

The example illustrated in FIG. 4 is a case where one tomographic image is captured. In contrast, according to the example illustrated in FIG. 5, a three-dimensional image is obtained, and one tomographic image 438 near the center of the area is displayed in the area 430. The tomographic image 438 is not limited to the tomographic image near the center of the rectangle 416, and may be the tomographic image of an edge portion of the rectangle 416. An examiner may also be allowed to preset a position in the rectangle 416 for which the tomographic image is to be displayed.

Imaging, Image Generation, and Analysis

In step S102, the light sources 101 and 141 respectively emit the measuring beam based on an imaging instruction from the operator. The control unit 191 sweeps the wavelength of the light emitted from the light source 101. The differential detector 129 and the APD 152 then receive the return beam from the fundus Er. As described above, in step S103 and step S104, the signal processing unit 190 generates and analyzes each image.

Output

The process for outputting the generated image and the analysis result performed in step S105 will be described below.

After the signal processing unit 190 completes generating and analyzing each image, the control unit 191 generates output information based on the result, and outputs to and displays on the display unit 192 the output information. The display examples on the display unit 192 will be described below.

The Display Screen

FIGS. 4, 5, 6, 7, 8, and 9 illustrate display examples on the display unit 192 according to the present exemplary embodiment.

Referring to FIG. 4, the window 400 includes the area 410, an area 420, and the area 430. More specifically, the areas 410 and 420 are arranged adjacent to each other above the area 430. The display example is not limited thereto, and the areas 410 and 420 may be arranged adjacent to each other below the area 430. Further, in the example illustrated in FIG. 4, the area 410 is positioned to the left of the area 420. However, it is not limited thereto, and the area 420 may be arranged to the left of the area 410. Furthermore, in the example illustrated in FIG. 4, the window 400 includes three areas. However, it is not limited thereto, and the area may include four or more areas, or two or less areas.

The area 430 displays the tomographic image 431, and the area 410 displays the fundus image 411. In other words, the fundus image display area is positioned above or below the tomographic image display area. Further, the area 420 displays information on the apparatus and information on a subject.

As illustrated in FIG. 4, the horizontal width of the area 430 is wider than those of the areas 410 and 420. Further, the horizontal width of the tomographic image 431 is wider than that of the fundus image 411. The width of the tomographic image display area is thus wider than that of the fundus image display area. In the example illustrated in FIG. 4, the sum of the horizontal widths of the areas 410 and 420 is equal to the horizontal width of the area 430. However, it is not limited thereto. The control unit 191 displays on the display unit 192 the tomographic image 431 and the fundus image 411. In other words, the example corresponds to an example of a display control unit in which the control unit 191 displays a fundus image in the first area of a display unit, positions a tomographic image above or below the first area, and displays the tomographic image in the second area which is an area of the display unit wider in the horizontal direction as compared to the first area.

Further, as illustrated in FIG. 4, the tomographic image 431 is displayed in the tomographic image display area set in the area 430 having a wider horizontal width as compared to the areas 410 and 420. As a result, the tomographic image 431 can be displayed wider in the horizontal direction as compared to the images displayed in the other areas. The tomographic image 431 can thus be displayed by reducing the tomographic image having wide angle of view by a small reduction ratio or without reducing the tomographic image. In other words, a tomographic image of a wide viewing angle becomes easily observable.

According to the present exemplary embodiment, since the OCT 100 has a deep imaging area, a tomographic image of a predetermined depth (i.e. a length in the vertical direction with respect to the drawing) from the coherence gate position is cut out and displayed to match the tomographic image display area.

Figure 7:
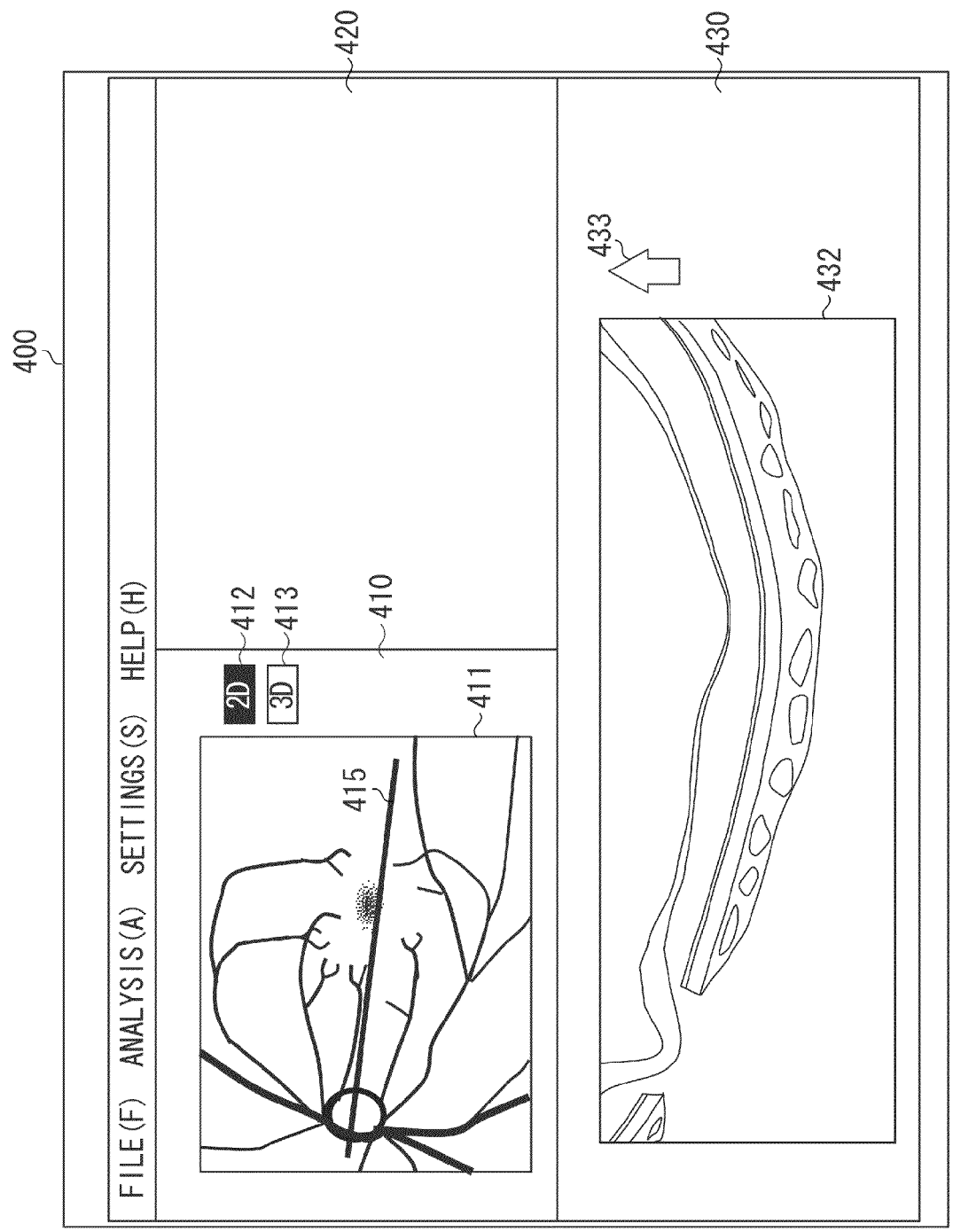
FIG. 7 illustrates a display example on the display unit according to the first exemplary embodiment.
Figure 8:
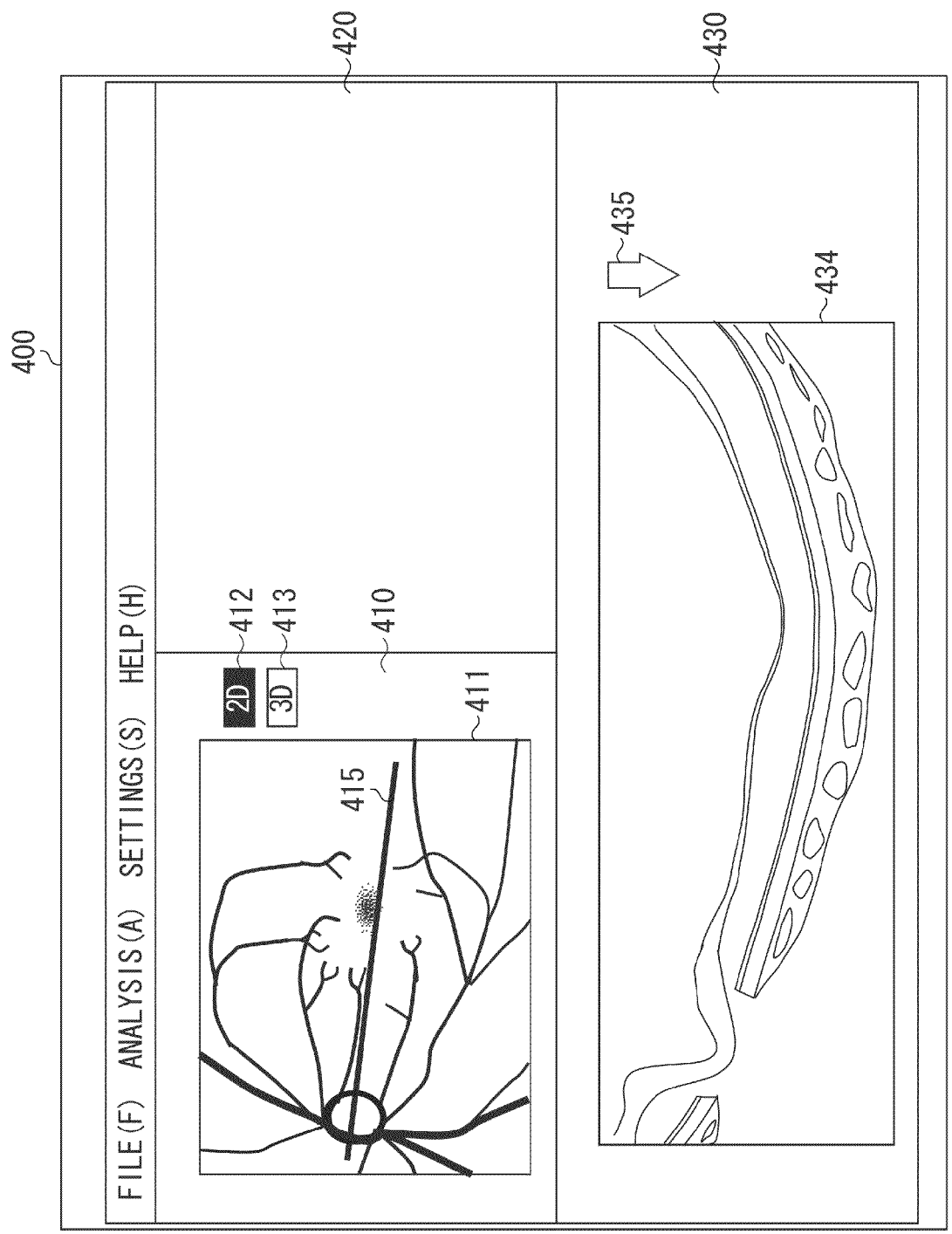
FIG. 8 illustrates a display example on the display unit according to the first exemplary embodiment.

If it is determined that, as a result of cutting out the tomographic image, the image of a fundus tissue of the subject's eye included in the tomographic image intersects a line defining the vertical direction of the tomographic image display area, the control unit 191 displays a designation area 433 as illustrated in FIG. 7. Referring to FIG. 7, if the operator designates the designation area 433 by clicking thereon, the control unit 191 may expand the tomographic image display area as illustrated in FIG. 8, and display more of the entire tomographic image. As a result, a tomographic image 434 as illustrated in FIG. 8 which is larger than the tomographic image 432 in the depth direction is displayed. From another point of view, if it is determined that the image of a fundus tissue of the subject's eye and the line defining the vertical direction of the tomographic image display area intersect, the control unit 191 expands the area 430. Referring to FIG. 8, if the user designates a designation area 435, the display returns to the state illustrated in FIG. 7. Further, referring to FIG. 8, the fundus image 411 may be superimposed with the area 430 and displayed. Further, the fundus image 411 may be reduced and displayed so that the fundus image 411 and the area 430 do not overlap. In other words, the fundus image display area may be reduced.

If the operator designates the designation area 433, the tomographic image display area may be expanded over the entire window 400 to display on the display unit 192 the portions of the tomographic image 432 that has not been displayed. Further, if the operator has selected a portion of the tomographic image displayed on the entire window 400, the control unit 191 may cut out the tomographic image including the selected portion and return to the display state illustrated in FIG. 7. Specifically, the control unit 191 displays the tomographic image including the selected portion as the tomographic image 432 as illustrated in FIG. 7. As a result, the examiner becomes capable of easily displaying the tomographic image of the desired position. According to the above-described examples, the display form is changed by designating the designation areas 433 and 435. However, it is not limited thereto, and the display form may be changed according to the operator double-clicking on the tomographic image 432.

Further, if the control unit 191 determines that the image of a fundus tissue of the subject's eye and the line defining the vertical direction of the tomographic image display area intersect, it is not necessary for the control unit 191 to display the designation area 433. In such a case, the control unit 191 may automatically expand the tomographic image display area so that the tomographic image 432 becomes the tomographic image 434. Specifically, if the image of the fundus tissue of the subject's eye included in the tomographic image comes into contact with an upper edge of the second area, the control unit 191 expands the second area, and displays the tomographic image on the expanded second area. Further, in such a case, the control unit 191 reduces the fundus image 411 so that the fundus image 411 and the area 430 do not overlap. In other words, if the second area is expanded, the first area and the fundus image are reduced, so that the designation areas 433 and 435 become unnecessary.

Figure 9A:
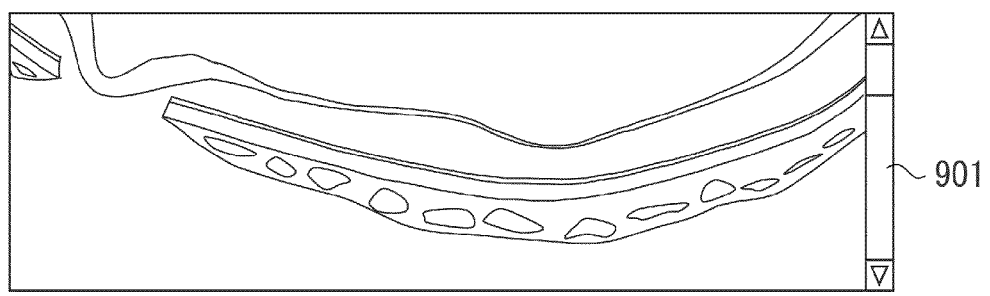
FIGS. 9A and 9B illustrate display examples on the display unit according to the first exemplary embodiment.
Figure 9B:
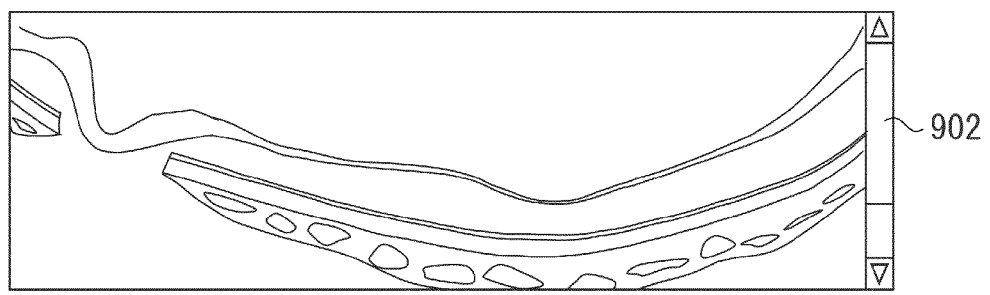

Furthermore, as illustrated in FIGS. 9A and 9B, areas 901 and 902 for scrolling the tomographic image may be added to the tomographic image, and the operator may scroll the tomographic image by designating thereon, instead of enlarging the area as described above. FIG. 9B illustrates the display example in the case where the operator scrolls upward from the state illustrated in FIG. 9A. The control unit 191 adds the areas 901 and 902. The control unit 191 may only add the areas 901 and 902 in the case where it is determined that the image of a fundus tissue of the subject's eye and the line defining the vertical direction of the tomographic image display area intersect, or may regularly add the areas 901 and 902. The display control unit thus displays, if the image of the fundus tissue of the subject's eye included in the tomographic image comes into contact with the upper edge of the second area, a scroll bar which allows the tomographic image displayed on the display unit to be scrolled in the vertical direction.

FIG. 5 illustrates the state where the tomographic image 438 is displayed on the area 430 as the tomographic image captured in the 3D imaging mode. The OCT 100 obtains as the three-dimensional data the information of the area set by the rectangle 416, and the control unit 191 displays on the display unit 192 one tomographic image 438 near the center of the rectangle 416. The tomographic image 438 is not limited to the tomographic image near the center of the rectangle 416, and may be the tomographic image of the edge portion of the rectangle 416.

Figure 6:
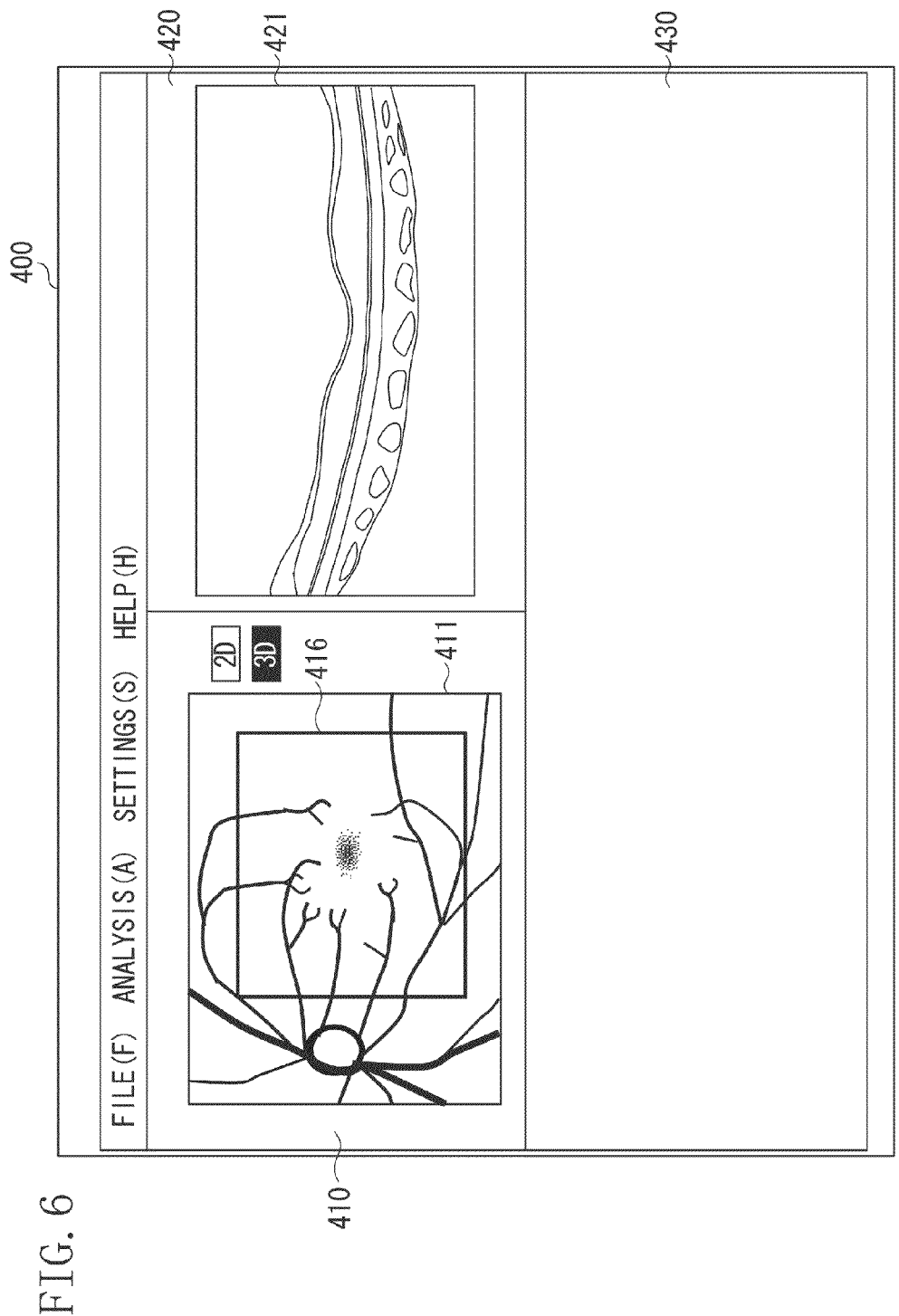
FIG. 6 illustrates a display example on the display unit according to the first exemplary embodiment.

A display screen as illustrated in FIG. 6 may be displayed instead of the display screen illustrated in FIG. 5. Referring to FIG. 6, the area defined by the exterior frame of a tomographic image 421 is positioned to the right of the fundus image display area. However, it is not limited thereto, and the area may be positioned to the left of the fundus image display area. Further, the area defined by the exterior frame of a tomographic image 421 is positioned above the tomographic image display area. However, it is not limited thereto, and the area may be positioned below the tomographic image display area. Furthermore, the area defined by the exterior frame of a tomographic image 421 is narrower in the horizontal direction as compared to the tomographic image display area. In other words, the area defined by the exterior frame of a tomographic image 421 corresponds to an example of a third area which is positioned to the left or the right of the first area and which is an area narrower in the horizontal direction as compared to the second area. In such a case, the display area of the tomographic image becomes small, so that the information on the apparatus can be displayed on a wide area. The display areas can thus be efficiently used in the display states illustrated in FIGS. 4 and 6.

The control unit 191 may switch between displaying as illustrated in FIG. 4 and as illustrated in FIG. 6 according to the imaging area. For example, if the angle of view of the imaging area is wider than the predetermined value, the control unit 191 may display the tomographic image as illustrated in FIG. 4, and if the angle of view of the imaging area is less than or equal to the predetermined value, the control unit 191 may display the tomographic image as illustrated in FIG. 6. The display control unit thus determines the area for displaying the tomographic image according to the angle of view of the tomographic image. More specifically, the display control unit displays on the first area the tomographic image whose angle of view is greater than or equal to a threshold value. Further, the display control unit displays the tomographic image whose angle of view is less than the threshold value on the third area which is positioned to the left or the right of the first area and which is an area narrower in the horizontal direction as compared to the second area.

According to the above-described example, the control unit 191 switches the display form according to the angle of view. However, the area for displaying the tomographic image may be changed based on whether the tomographic image includes both or one of the optic disk and the macula. For example, if the tomographic image includes the optic disk and the macula, the control unit 191 displays the tomographic image as illustrated in FIG. 4. If the tomographic image only includes the optic disk or the macula, the control unit 191 displays the tomographic image as illustrated in FIG. 6. The display control unit thus displays, if the tomographic image includes both the optic disk and the macula of the subject's eye, the tomographic image on the first area. Further, if the tomographic image only includes the optic disk or the macula, the display control unit displays the tomographic image on the third area which is positioned to the left or the right of the first area and which is an area narrower in the horizontal direction as compared to the second area.

As a result, the area to be displayed is determined according to the angle of view or a characteristic portion such as the optic disk and the macula. The area of the display screen can thus be efficiently used.

As described above, according to the present exemplary embodiment, the tomographic image of a wide angle of view obtained by the SS-OCT can be efficiently presented. Further, if the tomographic image cannot be fully displayed in the preset tomographic image display area, the area is enlarged and the tomographic image is displayed. The tomographic image can thus be displayed without reducing the resolution, or by suppressing lowering of the resolution. Furthermore, if the tomographic image cannot be fully displayed in the preset tomographic image display area, the tomographic image is displayed by scrolling the area, so that the tomographic image of the portion to be observed can be displayed.

Modified Example

Figure 10:
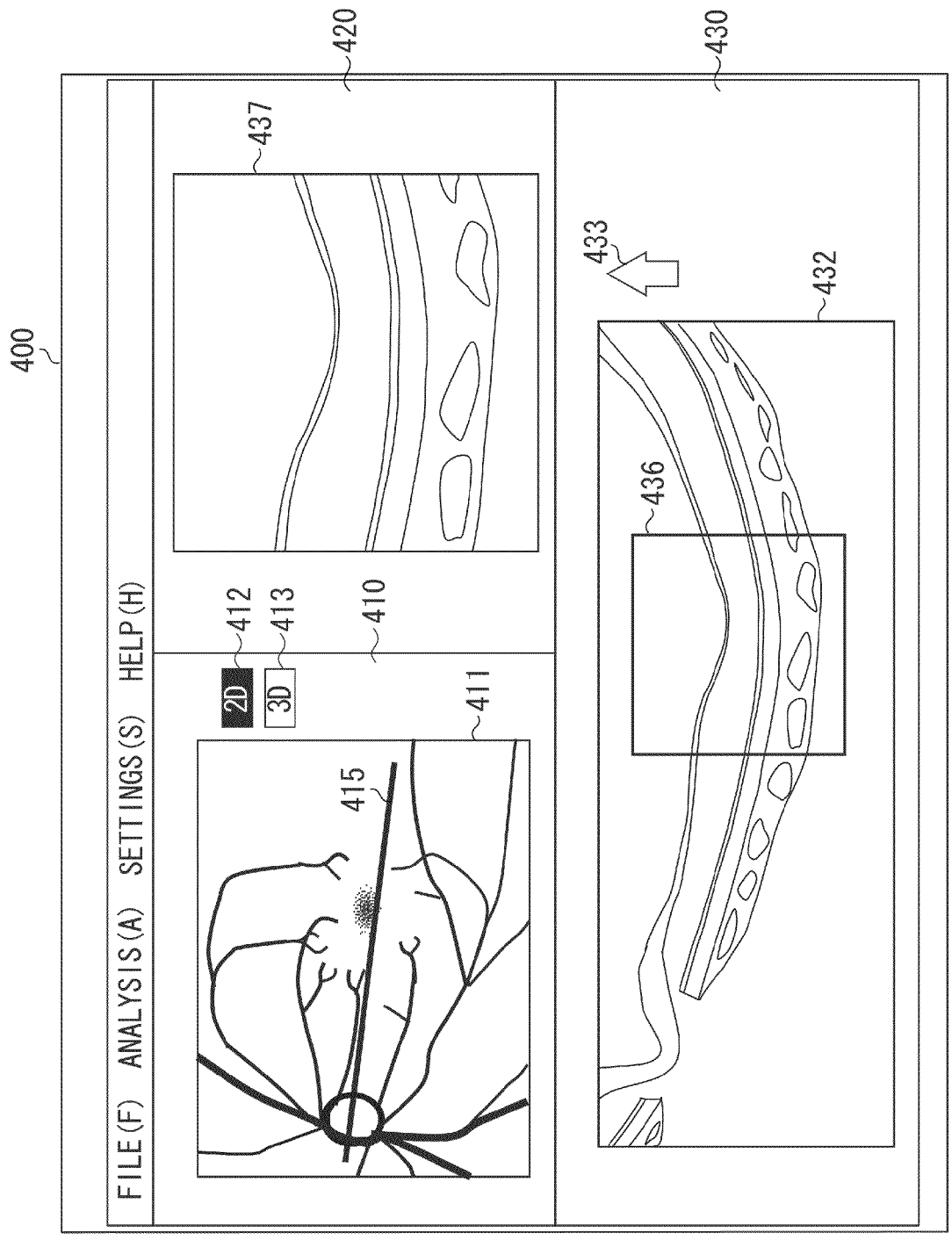
FIG. 10 illustrates a display example on the display unit according to the first exemplary embodiment.

The display example on the display unit 192 is not limited to the above. For example, the display unit 192 may display the tomographic image as illustrated in FIG. 10. Referring to FIG. 10, the area 430 displays the tomographic image 432 obtained by the OCT 100. If the operator then selects using the instruction device such as the mouse a portion of the tomographic image 432 displayed on the area 430, the control unit 191 displays on the area 420 a tomographic image 437 of a selected area 436. The area defined by the exterior frame of the tomographic image 437 corresponds to an example of the third area. Since the area defined by the exterior frame of the tomographic image 437 is proximately similar to the above-described area defined by the exterior frame of the tomographic image 421, detailed description on the positional relation with the other areas will be omitted.

The control unit 191 enlarges the tomographic image in the area 436 to match the size of the area 420 and displays the tomographic image. The display control unit thus enlarges, if a selection unit selects a portion of the tomographic image displayed on the second area, the selected portion of the tomographic image. The display control unit displays the enlarged tomographic image on the third area which is positioned to the left or the right of the first area and which is an area narrower in the horizontal direction as compared to the second area. The control unit 191 displays on the tomographic image 432 the area 436 selected using the instruction device.

According to the above-described modified example, a positional relationship between the tomographic image of the wide viewing angle and a portion of the tomographic image becomes recognizable. Further, the portion of the tomographic image of the wide angle of view can be observed in detail. As a result, an efficient diagnosis can be performed.

The second exemplary embodiment will be described below.

According to the first exemplary embodiment, the SS-OCT and the SLO are integrated in the apparatus. According to the present exemplary embodiment, the fundus camera is used instead of the SLO as the optical system for observing the fundus of the subject's eye, and the SS-OCT and the fundus camera are integrated in the apparatus. Further, according to the first exemplary embodiment, the X scanner 107 and the Y scanner 110 are separately included in the OCT 100. In contrast, according to the present exemplary embodiment, the scanners are integrally configured as an XY scanner 338, and included in the fundus camera main body 300. However, the present invention is not limited thereto. Furthermore, according to the present exemplary embodiment, an infrared area sensor 321 for performing infrared fundus observation is included in the fundus camera main body 300 separately from a camera unit 330. If an area sensor 331 in the camera unit 330 is configured to have sensitivity to both the infrared light and the visible light, it is not necessary to include the infrared area sensor 321.

Figure 11:
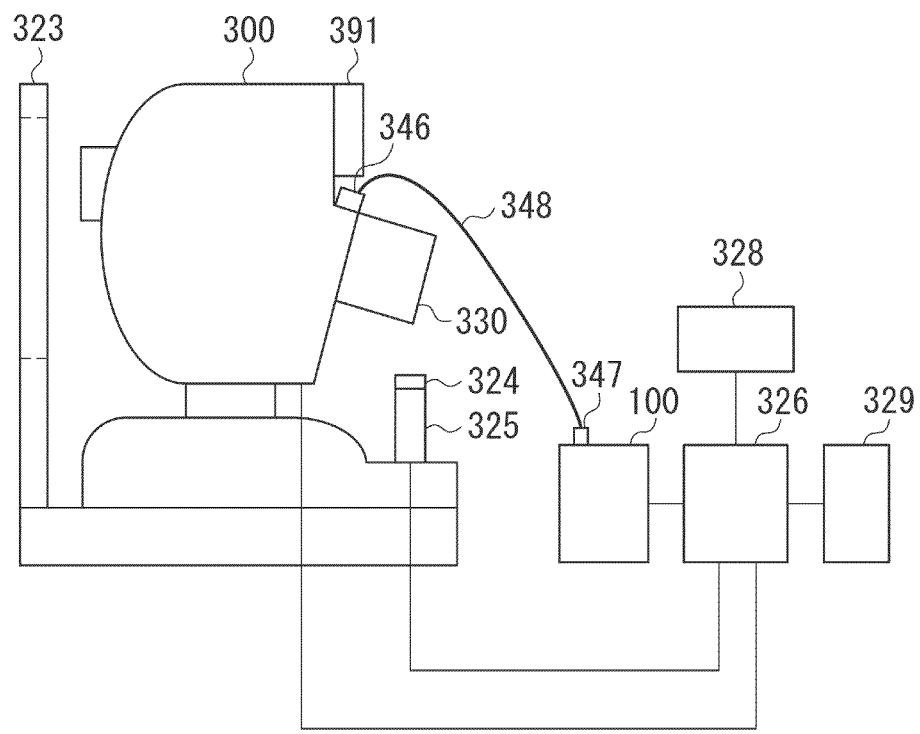
FIG. 11 is a lateral view illustrating an optical coherence tomographic imaging apparatus according to a second exemplary embodiment.

The configuration of the optical coherence tomographic imaging apparatus according to the present exemplary embodiment will be described below with reference to FIG. 11. FIG. 11 is a lateral view illustrating the optical coherence tomographic imaging apparatus according to the present exemplary embodiment. Referring to FIG. 11, the fundus camera main body 300 and the camera unit 330 are optically connected. Further, the fundus camera main body 300 and the OCT 100 are optically connected via an optical fiber 348. Furthermore, the fundus camera main body 300 and the OCT 100 respectively include a connector 346 and a connector 347. A chin support 323 fixes a chin and a forehead of the subject so that the subject's eye is fixed. A monitor 391 displays an infrared image for performing adjustment in imaging.

A joystick 325 is used by the examiner for controlling movement of the fundus camera main body 300 to align with the subject's eye. An operation switch 324 is a signal input unit used for inputting the operations for performing imaging of the tomographic image and the fundus image. A control unit 326 which is configured with a personal computer controls the fundus camera main body 300, the camera unit 330, the configuration of the tomographic image, and displaying of the tomographic image and the fundus image. A control unit monitor 328 is a display unit, and a storing unit 329 is a hard disk that stores programs and captured images. The storing unit 329 may be included in the control unit 326. The camera unit 330 is a general-purpose digital single-lens reflex camera, and is connected to the fundus camera main body 300 by a general-purpose camera mount.

The Optical System of the Fundus Camera Main Body

Figure 12:
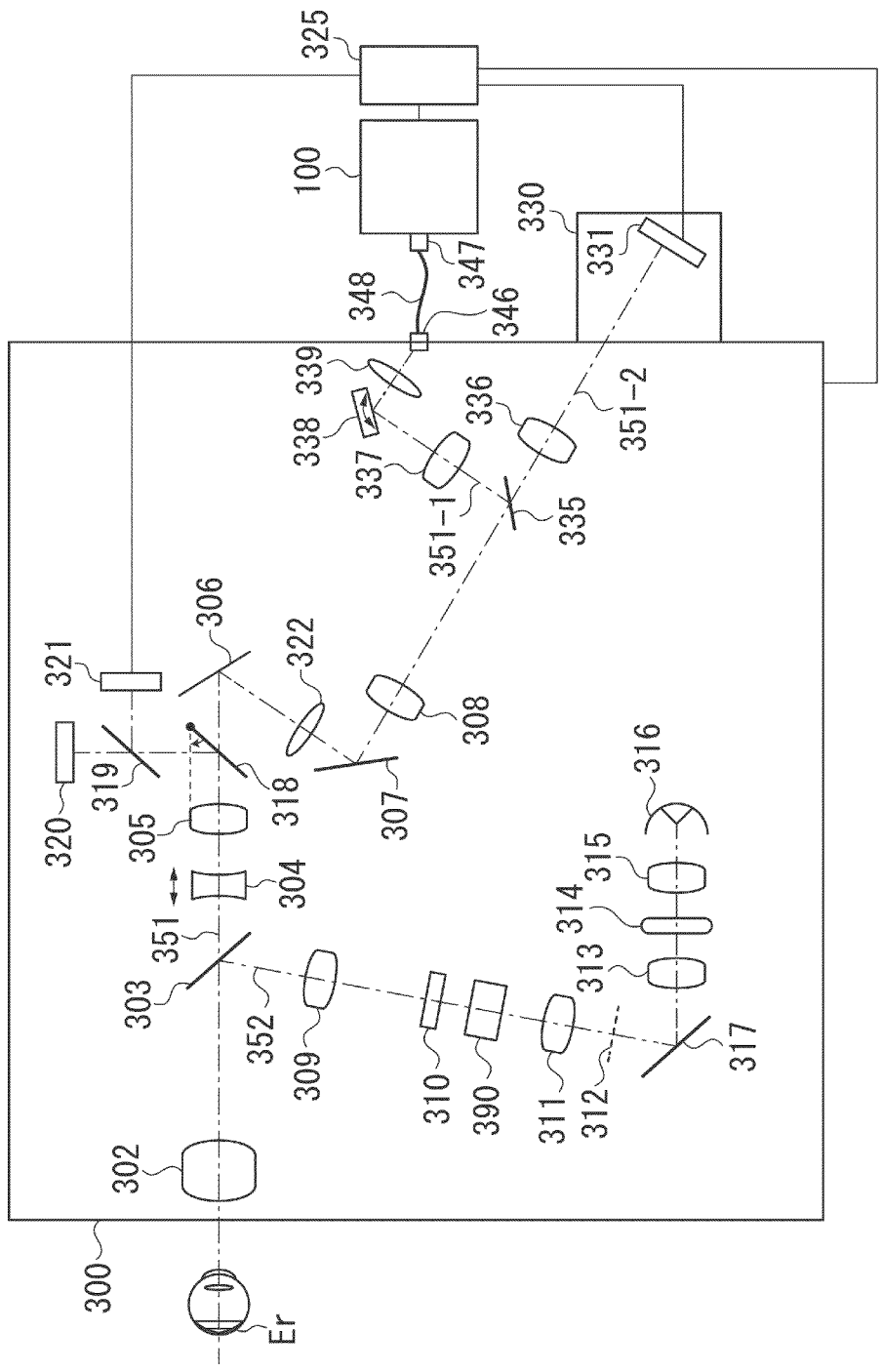
FIG. 12 is a schematic diagram illustrating an example of an optical system in a fundus camera main body according to the second exemplary embodiment.

The optical system of the fundus camera main body 300 will be described below with reference to FIG. 12. FIG. 12 is a schematic diagram illustrating the optical system of the fundus camera main body 300.

Referring to FIG. 12, an objective lens 302 is arranged opposing the subject's eye, and a perforated mirror 303 on the optical axis divides the optical path into an optical path 351 and an optical path 352. The optical path 352 forms an illumination optical system that illuminates the fundus Er of the subject's eye. A halogen lamp 316 used for performing alignment of the subject's eye and a stroboscopic tube 314 used for imaging the fundus Er of the subject's eye are arranged in a lower portion of the fundus camera main body 300. Further, the fundus camera main body 300 includes condenser lenses 313 and 315 and a mirror 317. The illuminating light from the halogen lamp 316 and the stroboscopic tube 314 is formed into a ring-shaped light flux by a ring slit 312, reflected by the perforated mirror 303, and illuminates the fundus Er of the subject's eye. The light emitted from the halogen lamp 316 illuminates the subject's eye as light of the wavelength band of 700 nm to 800 nm. The light emitted from the stroboscopic tube 314 illuminates the subject's eye as light of the wavelength band of 400 nm to 700 nm.

Furthermore, the fundus camera main body 300 includes lenses 309 and 311, and an optical filter 310. An alignment optical system 390 projects a split image for focusing on the fundus Er, or an index for matching the subject's eye and the optical axis of the optical path of the optical system in the fundus camera main body 300.

The optical path 351 forms an imaging optical system for obtaining the tomographic image and the fundus image of the fundus Er of the subject's eye. A focus lens 304 and an image forming lens 305 are arranged on the right side of the perforated mirror 303. The focus lens 304 is supported to be movable in the optical axis direction by the examiner operating a knob (not illustrated).

The optical path 351 is guided via a quick return mirror 318 to a fixation lamp 320 and the infrared area sensor 321. The quick return mirror 318 reflects the infrared light for obtaining the fundus observation image (e.g., light of 700 nm to 800 nm wavelength band), and transmits the infrared light of the wavelength band used in capturing the tomographic image (e.g., light of 980 nm to 1100 nm wavelength band). Further, a silver film and a protection film thereof are formed in such an order on the surface the quick return mirror 318. If the infrared area sensor 321 is to obtain the moving image and the tomographic image of the fundus using the infrared light, the quick return mirror 318 is inserted in the optical path 351. It is desirable that the quick return mirror 318 does not transmit visible light (e.g., light of 400 nm to 700 nm wavelength band 1301 in FIG. 13B) that is unnecessary in obtaining the moving image and the tomographic image of the fundus. On the other hand, if the still image of the fundus is to be obtained using the visible light, a control unit (not illustrated) retracts the quick return mirror 318 from the optical path 351.

The image information obtained by the infrared area sensor 321 is displayed on the display unit 328 or the monitor 391, and used for performing alignment of the subject's eye. Further, a dichroic mirror 319 is designed so that the visible light is guided towards the fixation lamp 320 and the infrared light is guided towards the infrared area sensor 321. The optical path 351 is then guided to the camera unit 330 side via a mirror 306, a field lens 322, a mirror 307, and a relay lens 308.

The quick return mirror 318 may be a dichroic mirror which reflects light of 700 nm to 800 nm wavelength band and transmits light of 400 nm to 700 nm wavelength band and light of 980 nm to 1100 nm wavelength band. In such a case, a reflected light path of the dichroic mirror 318 and an optical path of the XY scanner 338 disposed in the reflected light path of a dichroic mirror 335 to be described below and connected to the OCT 100, may be interchanged. Further, in such a case, if the camera unit 330 is configured to have sensitivity to the infrared wavelength band, the infrared area sensor 321 may be omitted.

If the camera unit 330 is sensitive to both the infrared light and the visible light, it is desirable to store in the storage unit a movement amount of the focus lens 304 corresponding to the optical path length difference generated due to the difference in the wavelength bands. The focus lens 304 is thus moved by the stored movement amount in synchronization with imaging of the subject's eye. In such a case, the following process may be performed. After performing the infrared fundus observation, the focus lens 304 is moved, and the SS-OCT performs imaging. The focus lens 304 is further moved, and visible light fundus imaging is performed. Further, it is desirable to move the focus lens 304 after the SS-OCT imaging is performed without moving the focus lens 304 after infrared fundus image observation, and then perform visible light fundus imaging. Since the difference between the wavelength bands for the SS-OCT and that for the visible light imaging is greater than the difference between the wavelength bands for the visible light imaging and that for the infrared observation, the above-described process is desirable. In an alternative embodiment of the present invention, the focus lens is not moved but the optical path distance between the object and the focus lens changes.

The SS-OCT performs detection using the optical detection device while sweeping the wavelength, so that cumulative time is shorter as compared to the SD-OCT. Further, since the dichroic mirror is configured with a multilayer film, light passes through all of the layers in a transmitted light path of the dichroic mirror. The effect of noise caused by the interference occurring in the multilayer film thus tends to increase. To solve such a problem, it is desirable to arrange the optical path of the OCT 100 in the reflected light path of the dichroic mirror.

The optical path 351 is then divided via a dichroic mirror 335 into a tomographic imaging optical path 351-1 and a visible fundus imaging optical path 351-2. The dichroic mirror 335 transmits light of 400 nm to 700 nm wavelength band, and reflects light of 980 nm to 1100 nm wavelength band. According to the present exemplary embodiment, the tomographic imaging optical path 351-1 and the visible fundus imaging optical path 351-2 are respectively configured as the reflected light path and the transmitted light path. However, the configuration may be reversed. In such a case, the wavelength band of the light transmitted by the dichroic mirror 335 and the wavelength band of the light reflected by the dichroic mirror 335 become reversed. Since light of the wavelength band between the wavelength bands of the light used in tomographic imaging and the light used in visible fundus imaging is unnecessary, the dichroic mirror 335 may be configured not to transmit or reflect (e.g., absorb) such wavelength band. Further, an optical member that cuts such a wavelength band may be arranged in front of the dichroic mirror 335.

Further, the apparatus includes relay lenses 336 and 337, an XY scanner 338, and a collimate lens 339. The XY scanner 338 is illustrated as a single mirror for ease of description. However, two mirrors, i.e., the X scan mirror and the Y scan mirror, are actually arranged close to each other, and perform raster scanning on the fundus Er in the direction perpendicular to the optical axis.

Further, the optical axis of the tomographic imaging optical path 351-1 is adjusted to match the rotational center of the two mirrors of the XY scanner 338. Furthermore, the connector 346 is used for attaching the optical fiber.

Moreover, the camera unit 330 is a digital single-reflex camera for imaging the fundus Er. The fundus camera main body 300 and the camera unit 330 are connected via a general-purpose camera mount, so that the camera unit 330 is easily detachable. The fundus image is formed on the surface of an area sensor 331.

Further, it is desirable to arrange in the illumination optical system, an autofluorescence excitation filter (not illustrated) that transmits light of 580 nm wavelength and can be inserted and removed from the system. Furthermore, it is desirable to arrange in the imaging optical system, an autofluorescence barrier filter (not illustrated) that transmits light of 620 nm to 700 nm wavelength band and can be inserted and removed from the system.

For example, if the subject's eye is to be illuminated with the infrared light of 700 nm to 800 nm wavelength band, the autofluorescence excitation filter and the autofluorescence barrier filter are removed from the respective optical paths. The planar image obtaining unit can thus obtain the infrared moving image of the subject's eye. If autofluorescence imaging of the subject's eye is then to be performed, the examiner presses an imaging button, and the control unit 325 automatically inserts the autofluorescence excitation filter and the autofluorescence barrier filter in the respective optical paths. As a result, the planar image obtaining unit can obtain the still image by the autofluorescence of the subject's eye.

Since an amount of luminescence is greater when performing autofluorescence imaging as compared to other imaging, myosis tends to occur in the subject's eye after performing autofluorescence imaging. It is thus desirable to perform autofluorescence imaging after performing SS-OCT imaging. If imaging is sequentially performed automatically, both types of imaging can be efficiently performed.

Further, when performing imaging, the focus lens may be moved to correct the displacement of the focus position generated by the above-described optical path length difference. In such a case, it is desirable that, when imaging of the subject's eye has been completed, in order to return to the state for obtaining the moving image, the autofluorescence excitation filter and the autofluorescence barrier filter are retracted from the respective optical paths, and the focus lens is moved to the original position.

The present exemplary embodiment is capable of obtaining a similar effect as the first exemplary embodiment.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-082373 filed Mar. 30, 2012, which is hereby incorporated by reference herein in its entirety.

What is claimed is:

1. An optical coherence tomographic imaging apparatus comprising:

an irradiation unit configured to irradiate a subject with light of a first wavelength band;

a planar image obtaining unit configured to obtain a first planar image of the subject based on a return light from the subject irradiated by the irradiation unit with the light of the first wavelength band;

a light source configured to emit a measuring light while sweeping a second wavelength band that is longer than the first wavelength band;

a tomographic image obtaining unit configured to obtain, after a first optical path length difference between the measuring light and a reference light is adjusted, a tomographic image of the subject based on a combined light obtained by combining a return light from the subject irradiated with the measuring light emitted from the light source by the irradiation unit and the reference light corresponding to the measuring light; and a correction unit configured to correct, before the tomographic image obtaining unit obtains the tomographic image, a second optical path length difference generated due to a difference between the first wavelength band and the second wavelength band, wherein the planar image obtaining unit obtains, after the tomographic image obtaining unit obtains the tomographic image, a second planar image of the subject based on a return light from the subject irradiated by the irradiation unit with light of a third wavelength band that is shorter than the second wavelength band, and wherein the correction unit corrects, before the planar image obtaining unit obtains the second planar image, a third optical path length difference generated due to a difference between the second wavelength band and the third wavelength band.

2. The optical coherence tomographic imaging apparatus according to claim 1, further comprising:

a moving unit configured, when the subject is to be irradiated via a focusing unit with light of the second wavelength band, to move the focusing unit along an optical path based on a movement amount corresponding to an optical path length difference generated due to a difference between the first wavelength band and the second wavelength band, the focusing unit focusing on an imaging unit, wherein the planar image obtaining unit obtains a planar image of the subject based on an output signal from the imaging unit, and wherein the tomographic image obtaining unit obtains, based on the combined light obtained by combining a return light from the subject irradiated by the irradiation unit while sweeping light of the second wavelength band and the reference light, a tomographic image of the subject at a position of the focusing unit moved by the moving unit.

3. The optical coherence tomographic imaging apparatus according to claim 1, wherein the subject is a subject's eye, and wherein the planar image obtaining unit automatically obtains the second planar image by performing autofluorescence imaging of a fundus of the subject's eye sequentially after the tomographic image obtaining unit obtains the tomographic image.

4. The optical coherence tomographic imaging apparatus according to claim 1, further comprising a dichroic mirror configured to divide an optical path into an optical path in which a sensor for obtaining the planar image is arranged and an optical path in which a sensor for obtaining the tomographic image is arranged, wherein the optical path in which the sensor for obtaining the tomographic image is arranged is a reflected light path.

5. An optical coherence tomographic imaging method comprising:

obtaining a first planar image of a subject based on a return light from the subject irradiated by an irradiation unit, wherein the irradiation unit irradiates the subject with light of a first wavelength band;

after a first optical path length difference between the measuring light and a reference light is adjusted, obtaining a tomographic image of the subject based on a combined light obtained by combining a return light from the subject irradiated with the measuring light emitted from the light source by the irradiation unit and the reference light corresponding to the measuring light, wherein the light source emits the measuring light while sweeping the second wavelength band that is longer than the first wavelength band; and before obtaining the tomographic image, correcting a second optical path length difference generated due to a difference between the first wavelength band and the second wavelength band, after obtaining the tomographic image, obtaining a second planar image of the subject based on a return light from the subject irradiated with light of a third wavelength band that is shorter than the second wavelength band, and before the second planar image is obtained, correcting a third optical path length difference generated due to a difference between the second wavelength band and the third wavelength band.

6. The optical coherence tomographic imaging method according to claim 5, further comprising:

moving, when the subject is to be irradiated via a focusing unit with light of the second wavelength band, the focusing unit along an optical path based on a movement amount corresponding to an optical path length difference generated due to a difference between the first wavelength band and the second wavelength band, the focusing unit focusing on an imaging unit, wherein in the obtaining the planar image, obtaining the planar image of the subject based on an output signal from the imaging unit, and wherein in the obtaining the tomographic image, obtaining, based on a combined light obtained by combining a return light from the subject irradiated by the irradiation unit while sweeping light of the second wavelength band and a reference light corresponding to light of the second wavelength band, a tomographic image of the subject at a position of the focusing unit.

7. The optical coherence tomographic imaging method according to claim 5, wherein the subject is a subject's eye, and wherein in the obtaining planar image, automatically obtaining the second planar image by performing autofluorescence imaging of a fundus of the subject's eye sequentially after the tomographic image obtaining unit obtains the tomographic image.

8. The optical coherence tomographic imaging method according to claim 5, further comprising a dichroic mirror configured to divide an optical path into an optical path in which a sensor for obtaining the planar image is arranged and an optical path in which a sensor for obtaining the tomographic image is arranged, wherein the optical path in which the sensor for obtaining the tomographic image is arranged is a reflected light path.

9. The optical coherence tomographic imaging apparatus according to claim 1, wherein:

a first wavelength is a longest wavelength in the first wavelength band;

a second wavelength is a shortest wavelength in the second wavelength band; and the first wavelength is less than the shortest wavelength.

10. An optical coherence tomographic imaging apparatus comprising:

a first light source configured to emit a light of a first wavelength band;

a planar image obtaining unit configured to obtain a planar image of a subject based on a return light from the subject irradiated with the light of the first wavelength band emitted from the first light source;

a second light source configured to emit a measuring light while sweeping a second wavelength band that is longer than the first wavelength band; and a tomographic image obtaining unit configured to obtain, after a first optical path length difference between the measuring light and the reference light is adjusted, a tomographic image of the subject based on a combined light obtained by combining a return light from the subject irradiated with the measuring light emitted from the second light source and a reference light corresponding to the measuring light, wherein at least one of an optical system of the tomographic image obtaining unit and an optical system of the planar image obtaining unit is configured so as to reduce a second optical path length difference generated due to a difference between the first wavelength band and the second wavelength band.

11. An optical coherence tomographic imaging apparatus comprising:

a planar image obtaining unit configured to obtain, by using a common imaging element, a first planar image of a subject based on a return light from the subject irradiated with infrared light and a second planar image of the subject based on a return light from the subject with visible light;

a light source configured to emit a measuring light while sweeping a wavelength band that is longer than a wavelength band of the infrared light; and a tomographic image obtaining unit configured to obtain, after a first optical path length difference between the measuring light and the reference light is adjusted, a tomographic image of the subject based on a combined light obtained by combining a return light from the subject irradiated with the measuring light emitted from the light source by the irradiation unit and a reference light corresponding to the measuring light, wherein the planar image obtaining unit obtains, before the tomographic image obtaining unit obtains the tomographic image, the first planar image, wherein the planar image obtaining unit obtains, after the tomographic image obtaining unit obtains the tomographic image, the second planar image, and wherein an optical system of the planar image obtaining unit is configured so as to reduce a second optical path length difference generated due to a difference between the wavelength band of the infrared light and a wavelength band of the visible light.

12. A non-transitory computer-readable storage medium in which instructions for performing the method according to claim 5 have been recorded so as to be read out and executed by an apparatus.

* * * * *